United States Patent [19]
Kleinberg et al.

[11] 3,753,099
[45] Aug. 14, 1973

[54] DEVICE AND METHOD FOR THE QUANTITATIVE MEASUREMENT OF FLUID ON PAPER STRIPS

[75] Inventors: Israel Kleinberg; Lorne M. Golub; Samuel M. Borden; Morris Settler, all of Winnipeg, Manitoba, Canada

[73] Assignee: Harco Electronics Ltd., Winnipeg, Manitoba, Canada

[22] Filed: Apr. 28, 1972

[21] Appl. No.: 248,629

[52] U.S. Cl............................. 324/61 QS, 161/44
[51] Int. Cl............................................ G01r 27/26
[58] Field of Search.................. 324/61 QS, 61 R, 324/61 P

[56] References Cited
UNITED STATES PATENTS
2,123,812  7/1938  Stevens et al. .................. 324/61 P
2,920,272  1/1960  Erdman et al. .................. 324/61 QS
3,000,101  9/1961  Giardino et al. .................. 324/61 P
3,189,802  6/1965  Zisman........................... 324/61 R X Primary Examiner—Stanley T. Krawczewicz
Attorney—Stanley G. Ade

[57] ABSTRACT

A fixed and movable jaw form opposing plates of a capacitor with a paper strip carrying micro amounts of fluid being engaged between the jaws and acting as a dielectric whose characteristics (quality factor Q and relative dielectric constant $E_r$) change depending upon the amount of fluid present on the paper between the jaws. This capacitor is connected with an electronic circuit which includes a digital readout meter. This meter reads the bias current on a transistor, the base of which is connected in circuit with the capacitor thus enabling the quantity of fluid present on the paper to be read out in microlitres.

18 Claims, 9 Drawing Figures

PATENTED AUG 14 1973 　　　　　　　　　　　　　3,753,099

THE MEASUREMENT OF GINGIVAL CREVICE FLUID VOLUME (PRIOR ART FIGS. 1-4)

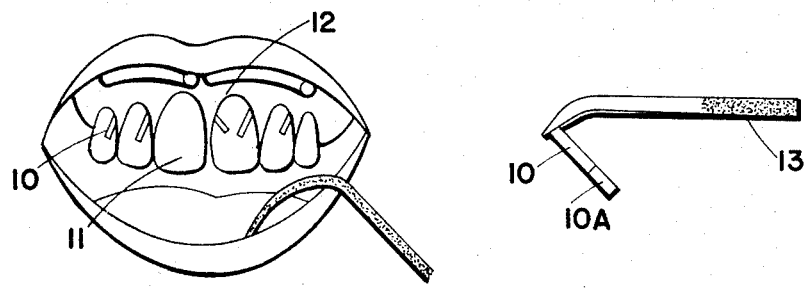

FIG. 1   PAPER STRIP INSERTED TO THE DEPTH OF THE GINGIVAL CREVICE OR POCKET AND LEFT IN PLACE FOR THREE MINUTES.

FIG. 2   STRIP REMOVED FROM GINGIVAL CREVICE.

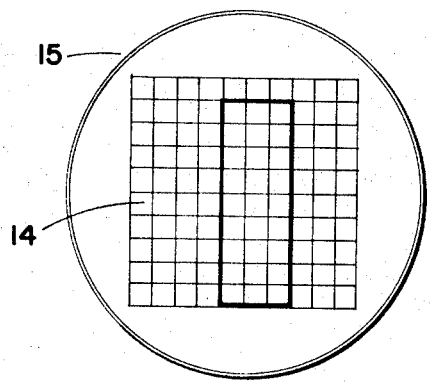 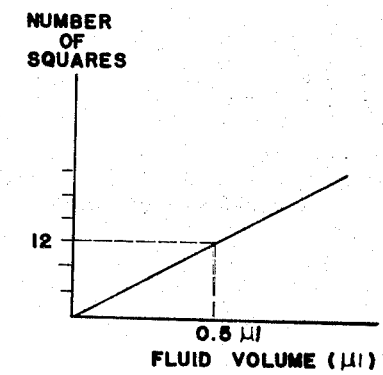

FIG. 3   STRIP OBSERVED UNDER MICROSCOPE FITTED WITH A GRID. THE NUMBER OF SQUARES OVERLYING WETTED AREA DETERMINED

FIG. 4   CREVICE FLUID VOLUME DETERMINED FROM STANDARD CURVE.

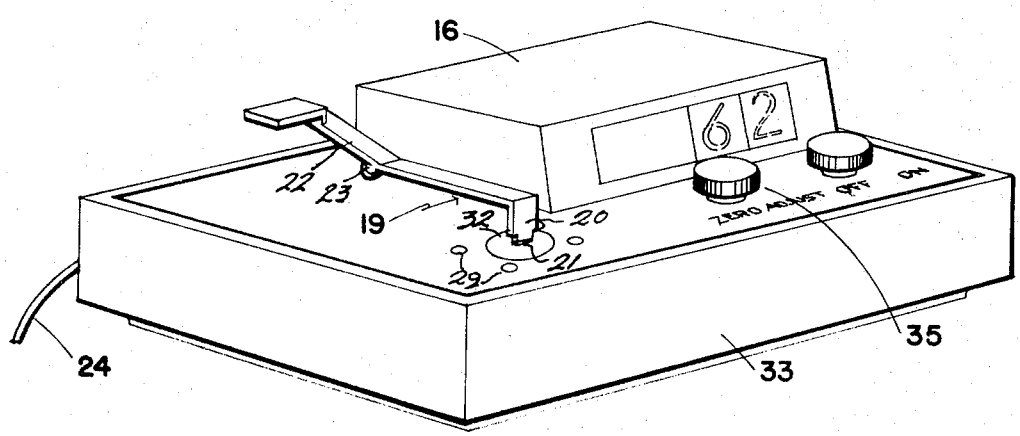

FIG. 5

DEVICE AND METHOD FOR THE QUANTITATIVE MEASUREMENT OF FLUID ON PAPER STRIPS

BACKGROUND OF THE INVENTION

This invention relates to new and useful improvements in devices and methods for the quantitative measurement of fluid on paper strips and is primarily directed to the measurement of fluid on paper strips inserted into gingival crevices for the diagnosis of inflammatory periodontal disease. However, it should be noted that the principals involved are not restricted to this particular use.

Periodontal disease is a general term used to describe diseases that affect the gums and bone around the teeth. The most common type, chronic inflammatory periodontal disease is quite insidious.

It occurs when tiny colonies of micro-organisms form at the junction between the gums and teeth and as these colonies grow they secrete toxic products which inflame the gums.

The combination of gum inflammation together with bacterial products destroys the natural seal between the gum and tooth, creating a pocket in which bacteria thrive.

The continuation of this inflammation eventually leads to loose teeth due to lack of bony support and unfortunately such a disease is not easily detected in the early stages at which time it can be checked more readily.

One of the principal reasons for lack of early diagnosis is due to the fact that sensitive and objective methods to detact early signs of the diseases have not been available.

Recently it has been found that if small strips of paper are slipped between the gum and the tooth into the pocket, and left for a predetermined time, the actual fluid volume in micro-litres can be ascertained. Conventionally this strip of paper is transferred to a microscope where the wet area of the relatively small strip is viewed under a grid. The number of squares of the grid overlying the wetted area is counted and this number is checked against a chart to get a reading of the actual fluid volume. It should be appreciated that a greater volume of gingival fluid reflects a greater degree of gum inflammation.

This method is not only time consuming but is subject to examiner error because of evaporation and lack of clear demarcation between the wetted and non-wetted portions. Impregnation of the paper with a chemical that changes in color with wetting can be used but this may render the sample unsuitable for some subsequent chemical analyses and it is believed that these subsequent chemical analyses could be invaluable in future diagnostic practices. As an example, if a strip showed a high concentration of sugar in the gingival fluid it could indicate that a patient had diabetes and this could be followed up by further examination by a physician.

SUMMARY OF THE INVENTION

The principal object of the present invention is to provide an electronic device which can be used to measure the volume of very small samples of fluid, prior to analysis of its constituents. The device can also be used to calibrate instruments or other apparatus designed to deliver very small quantities of fluid, such as ultramicro-pipettes, burettes and loops.

The device measures directly the volume in microlitres of the fluid present on a relatively small strip of paper and "reads out" this volume on a digital readout meter, it being understood, of course, that the meter registers base bias in micro-amperes as will hereinafter be described.

Another object of the invention is to provide a device of the character herewithin described which permits relatively instantaneous readings to be obtained thus cutting down losses due to evaporation and the like.

A yet further object of the invention is to provide a device of the character herewithin described which can be used by practising dentists as a routine diagnostic practice.

A still further object of the invention is to provide a device of the character herewithin described in which means are provided to adjust the parallel relationship between the movable and fixed jaws.

A yet further object of the invention is to provide a device of the character herewithin described which is relatively simple in operation, economical in manufacture and otherwise well suited to the purpose for which it is designed.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS

FIGS. 1 to 4 inclusive illustrate schematically the present method of measuring the gingival fluid in a crevice or pocket.

FIG. 5 is an isometric view of the device.

In the drawings like characters of reference indicate corresponding parts in the different figures.

DETAILED DESCRIPTION

Figure 6:
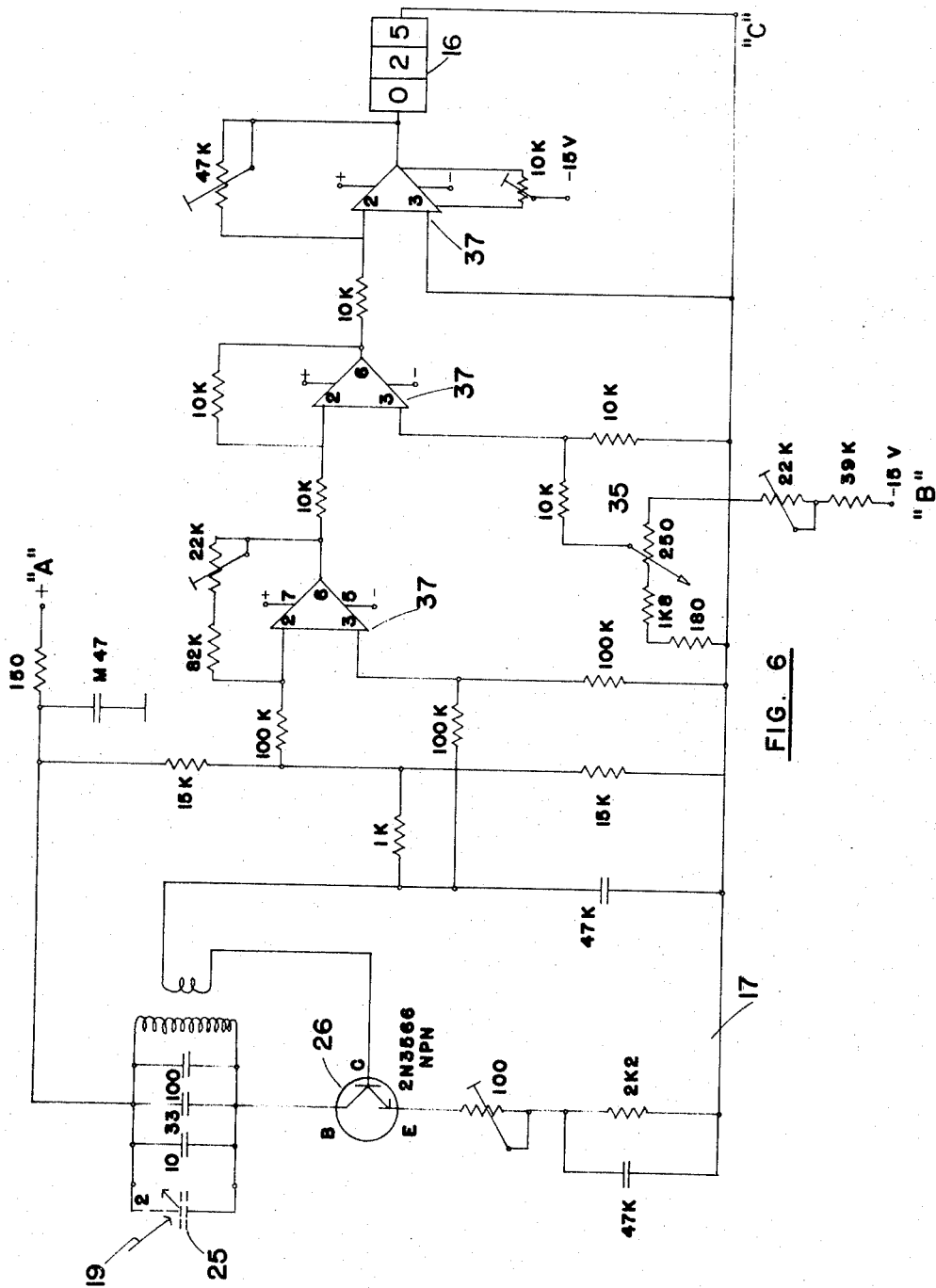
FIG. 6 is a schematic view of the electronics of the device.

Proceeding first to describe FIGS. 1 to 4, FIG. 1 shows paper strips 10 inserted to the depth of the gingival crevice or procket between the teeth 11 and the gum 12, said strips being left in place for approximately 3 minutes.

FIG. 2 shows the strip 10 removed by tweezers 13, with area 10A being the approximate amount of strip wetted by the crevice fluid.

This strip is then laid under a transparent grid 14 and viewed through a magnifying glass of microscope shown schematically at 15 whereupon the number of squares overlying the wetted area may be determined by counting.

FIG. 4 shows the standard curve or graph used to ascertain the crevice fluid volume from the number of squares counted in FIG. 3.

FIGS. 5 to 8 show the device which is the subject matter of the present invention and reference character 16 shows a digital readout device displaying digits and reading microamperes of current. 17 is a high frequency solid state oscillator (approximately 110 kilocycles) circuit. 18 is a regulated D.C. 24 volt power supply for the oscillator and 19 is a device for holding the relatively small paper strips 10 between two jaws 20 and 21, the lower jaw 21 being fixed but adjustable and the upper jaw 20 being movable and operated by means of lever 22 and pivoted at 23 to one side of the readout device 16. The jaw design is such that it reduces evaporation and leads to greater reproducibility. In addition, it can be shaped to hold material other than paper, for example, very small samples of biological tissue. 135

In the present embodiment it is essential that the two jaws 20 and 21 meet in exact parallel fashion and with the same amount of pressure. Consequently the lower or fixed jaw 21 centrally of a block of glass epoxy 27 or the equivalent which in turn is supported upon a base plate 28. This base plate is supported by four screws 29 extending down from the upper panel 30 and screw threadably engaging the base plate so that the block 27 is held within an aperture 31 formed in the panel 30 with the upper surface 32 substantially flush with the upper surface of the panel 30. The level or interfacial contact of the jaw 21 with the jaw 20 may thus be adjusted by the screws 29 and checked visually by sighting the junction of the jaws with a strong light behind.

The device is operated from 110 volt A.C. provided by power line 24 and the entire device is preferably mounted within an attractive cabinet 33 of which upper panel 30 forms a part, with the jaws 20 and 21 and the digital readout meter being mounted on the panel 30 as shown.

The two jaws 20 and 21 are heavily anodized aluminium so that they form perfect insulators one from the other, and with the paper strip 10 between them, form a variable capacitor 25 shown schematically in FIG. 6. THe capactior consists of two conductive pieces of material, the jaws 20 and 21 yet insulated from each other by the heavy anodizing and separated by the paper strip which is the dielectric material of the capacitor formed by the jaws and the paper strip 10.

The capacitor 25 formed by the jaws 20 and 21 and the paper strip 10 (completely dry) measures approximately 5 pico farads ($10^{-9}$ farads). As this paper strip is etted by the presense of gingival fluid thereon, (a) the "Q" factor (quality factor) of the dielectric (paper strip) changes and (b) the relative dielectric constant "$E_r$" of the paper changes. Both of these factors change the capacity of the capacitor 25 in the oscillator circuit 17 and from a completely dry strip to a completely wet strip, the capacity changes from approximately 5 pico farads (dry) to 15 pico farads (wet). The change of the "Q" factor effects a change in the amplitude of the oscillations (four times factor from dry to wet). The change of dielectric constant $E_r$ changes the frequency of the oscillations (from 110 $KH_z$ dry to 85 $KH_z$ wet).

Since the change in amplitude of the oscillations refelcts a much larger swing from dry to wet, this change is used, which is essentially a change in the base bias current (approximately 100 microamperes from dry to wet) in transistor 2N3566 (26). It is this bias current which is read on the digital meter 16, the volume of fluid — and the resultant degree of dryness or wetness on the strip reflecting a current change shown on the meter. A proportional change in fluid volume reflects a proportional change in base current.

Thus this technique will provide the specialist with an effective and expedient method of determining the gingival fluid volume as an index of the degree of periodontal disease.

The principal advantages are as follows:

a. The ability with this device to measure micro volumes of fluid on a very small strip of paper 10. The micro volumes discussed are in the order of $10^{-1}$ and $10^{-2}$ of a microlitre, i.e. 1/10 to 1/100 of a millionth part of a litre or 1,000 cc.

b. The capacitor 25 formed by the two anodized jaws 20 and 21 perfectly insulated from each other by virtue of the heavy anodizing yet in themselves conductive, separated by a dielectric which is formed by the small strip of paper 10 — whose dielectric changes (Q factor and the $E_r$ factor) when wetted by micro volumes of fluid — the change being great enough to be reflected on a digital microammeter 16 and proportionate in current change to fluid volume on the strip 10.

c. Because the pressure on the paper between the jaws is critical and should be consistent for the life of the instrument, the movable jaw 20 will exert a force on the strip of paper 10 by virtue of spring 34, thus ensuring a consistent pressure throughout the life of the instrument.

d. The instrument incorporates a zeroing device 35 in the form of an adjustable potentiometer to compensate for minute differences in paper strip size and moisture content — although very close attention must be paid to these factors in prepackaging the strips in order to obtain the reliability and repeatability expected of this instrument.

Figure 7:
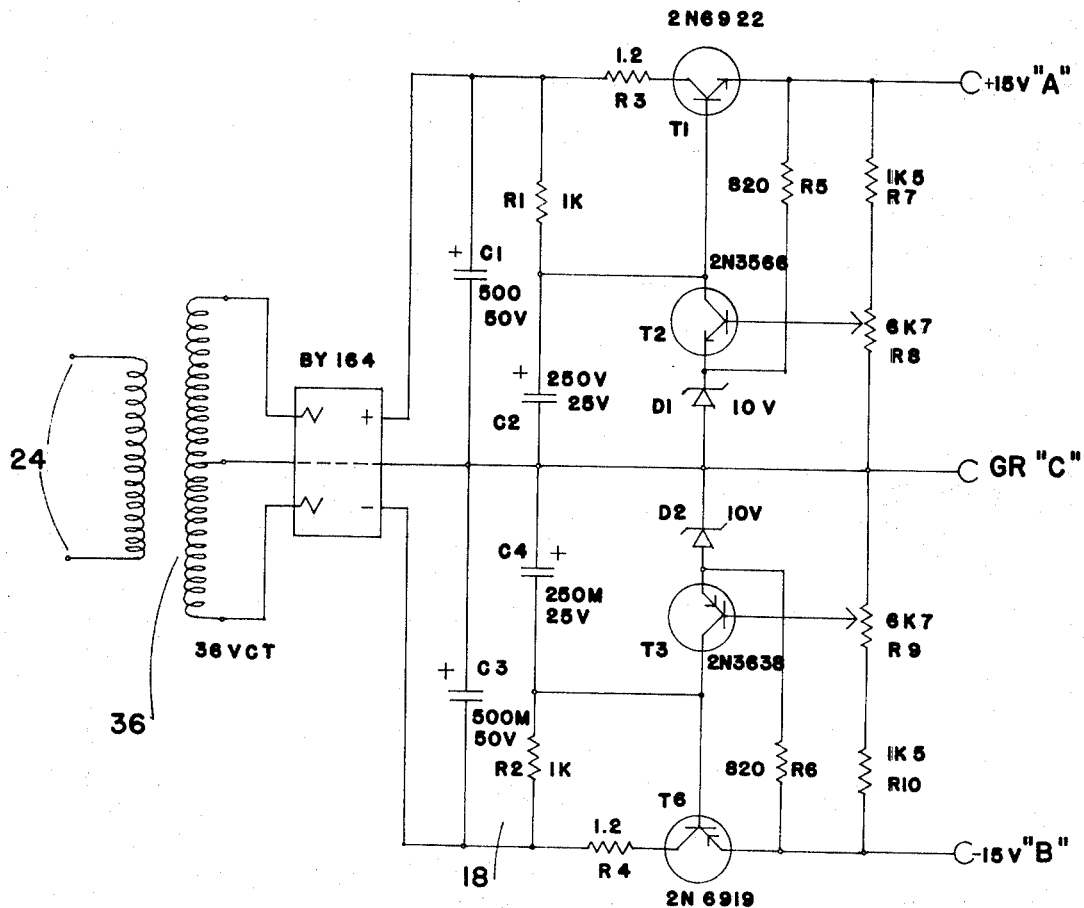
FIG. 7 is a schematic view of the power supply portion of the electronic section.
Figure 8:
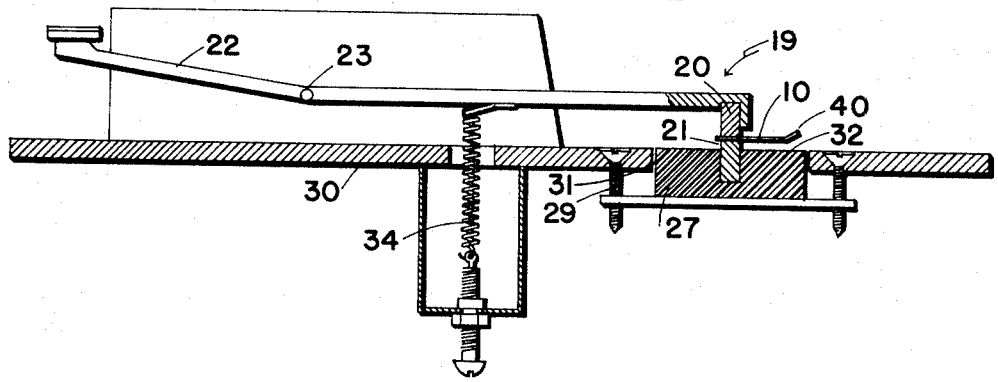
FIG. 8 is a cross sectional view of the top panel showing the mounting of the jaws.

The power supply shown in FIG. 7 is normally operated from 110 volts A.C. as indicated by reference character 24 through power transformer 36 and thence to a conventional transistorized circuit 18 which provides a regulated power supply to ensure reproducibility and stability in spite of line voltage fluctuations and other factors which might effect a constant voltage supply to the electronic circuitry shown in FIG. 6.

The power supply, in this embodiment, is provided with a +15 volt supply "A" a −15 volt supply "B", and a ground "C" and these three leads are shown by similar reference characters in FIG. 6.

A plurality of integrated circuits I.C. such as Fairchild 741 or equivalent, are indicated by reference character 37 receiving signals from the oscillating circuit 17 and feeding same to the digital readout meter 16 in the form of milliammeter in circuit with the out put from the transistor 26 which, of course, in turn is controlled by the capacitance action of the jaws 20 and 21 and the paper strip 20 therebetween. However, as the basic electronics are conventional it is not believed necessary to describe same further.

Figure 9:
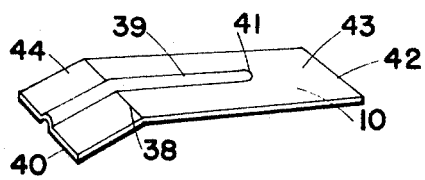
FIG. 9 is an enlarged isometric view of the preferred form of the paper strip.

FIG. 9 shows the preferred form of the paper strips 10 in which the strip is angulated transversely adjacent one end thereof as indicated by reference character 38. Furthermore a longitudinally extending ridge 39 is impressed upon the paper strip extending from end 40 to a point 41 spaced from the other end 42 thus leaving portion 43 which is inserted within the gingival crevice and uttimately between jaws 20 and 21. The longitudinal ridge or crease 39 facilitates handling of the paper strips and prevents them from bending during use, it being understood that they are normally handled by tweezers engaging the portion 44.

The transverse angulation at 38 also facilitates the manipulation of the paper strips by means of the conventional tweezers and assists in engaging same within the gingival crevices. Also when the strips are lying on a supporting surface, the angulation 38 facilitates the engagement of the tweezers with the end 40.

Although the present device has been designed primarily for use for gingival crevice fluid measurements, it can also be used to calibrate micro-burettes, micropipettes, syringes, loops and the like. By altering the jaws of the instrument, it can also measure micro fluid volumes of other things than strips of paper, e.g., tissue.

Furthermore, it could be used for measuring human sweat a most desirable measurement for stress and other physiological determinations.

With the advent of contact lenses, it is desirable to measure the micro volumes of lacrimal fluid in determining wearer acceptance of contact lenses inasmuch as the absence of fluid has proven to be a major obstacle in fitting contact lenses. Therefore the device could be used as a screening technique for potential successful contact lens users.

Denture wearers who do not have adequate salival have difficulty wearing dentures and it is therefore important that the dentist be able to separate out those patients who exhibit poor salivary volume. The potential of measuring salivary volume could therefore become important as a screening technique.

The device could also be used to differentiate between bound and loosely bound water in tissue thus providing a diagnostic tool in differentiating between caries susceptible and caries in active individuals.

Summarizing, the meter hereinbefore described is particularly suitable for use in areas requiring measurements of extremely small volumes of fluids.

For example, the existing device can measure fluid volumes with second decimal resolution up to one microlitre. With this type of reliability and repeatability, it can be used to calibrate micro instruments as above mentioned.

Various modifications may be constructed or performed within the scope of the inventive concept disclosed. Therefore what has been set forth is intended to illustrate such concept and is not for the purpose of limiting protection to any herein particularly described embodiment thereof.

What we claim as our invention is:

1. A device for the quantitative measurement of fluid on paper strips comprising a casing, a regulated power supply, electronic circuitry connected to said power supply and a digital readout meter operatively connected in said circuit, and variable capacitor means in said circuit, said variable capacitor means including a pair of plates and dielectric strip engageable therebetween said strip comprising a paper strip capable of receiving fluid thereon, the amount of fluid varying the capacitance of said capacitor, and means operatively connecting said capacitor to the said digital readout meter whereby said meter indicates the volume of fluid on said paper strip.

2. The device according to claim 1 which includes a transistor in said circuit, said variable capacitor being connected to the base of said transistor whereby said meter indicates the milliampere current at said base.

3. The device according to claim 1 in which said variable capacitor comprises a fixed jaw and a movable jaw, said paper strip being engaged therebetween, and means to apply constant pressure upon said paper strip by said jaws.

4. The device according to claim 2 in which said variable capacitor comprises a fixed jaw and a movable jaw, said paper strip being engaged therebetween, and means to apply constant pressure upon said paper strip by said jaws.

5. The device according to claim 3 in which said means includes said movable jaw being pivoted intermediate the ends thereof, and/adjustable spring means reacting between said movable jaw and said casing thereby biassing said jaws together.

6. The device according to claim 4 in which said means includes said movable jaw being pivoted intermediate the ends thereof, and adjustable spring means reacting between said movable jaw and said casing thereby biassing said jaws together.

7. The device according to claim 3 which includes means to adjust the parallel relationship between the interfacial engagement of said jaws, said last means including an insulated block, said fixed jaw being mounted on said block and extending upwardly therefrom, a base plate secured to the underside of said block, and a plurality of adjustable mounting screws screw threadably securing said base plate to the upper panel of said casing whereby adjustment of said screws varies the position within limits, of said fixed jaw relative to the plane of said upper jaw.

8. The device according to claim 4 which includes means to adjust the parallel relationship between the interfacial engagement of said jaws, said last means including an insulated block, said fixed jaw being mounted on said block and extending upwardly therefrom, a base plate secured to the underside of said block, and a plurality of adjustable mounting screws screw threadably securing said base plate to the upper panel of said casing whereby adjustment of said screws varies the position within limits, of said fixed jaw relative to the plane of said upper jaw.

9. The device according to claim 5 which includes means to adjust the parallel relationship between the interfacial engagement of said jaws, said last means including an insulated block, said fixed jaw being mounted on said block and extending upwardly therefrom, a base plate secured to the underside of said block, and a plurality of adjustable mounting screws screw threadably securing said base plate to the upper panel of said casing whereby adjustment of said screws varies the position within limits, of said fixed jaw relative to the plane of said upper jaw.

10. The device according to claim 6 which includes means to adjust the parallel relationship between the interfacial engagement of said jaws, said last means including an insulated block, said fixed jaw being mounted on said block and extending upwardly therefrom, a base plate secured to the underside of said block, and a plurality of adjustable mounting screws screw threadably securing said base plate to the upper panel of said casing whereby adjustment of said screws varies the position within limits, of said fixed jaw relative to the plane of said upper jaw.

11. The device according to claim 1 in which said paper strip is substantially rectangular when viewed in plan, one end of said strip being angulated with respect to the other end thereof by means of a transverse crease formed across said strip therby providing a tweezer-engaging tab at said one end, and a longitudinally extending rib formed on said strip and extending from said one end to a point spaced from said other end to stiffen said strip and facilitate manipulation thereof.

12 The device according to claim 3 in which said paper strip is substantially rectangular when viewed in plan, one end of said strip being angulated with respect to the other end thereof by means of a transverse crease formed across said strip thereby providing a tweezer-engaging tab at said one end, and a longitudinally extending rib formed on said strip and extending from said one end to a point spaced from said other end to stiffen said strip and facilitate manipulation thereof.

13. The device according to claim 5 in which said paper strip is sbustantially rectangular when viewed in plan, one end of said strip being angulated with respect to the other end thereof by means of a transverse crease formed across said strip thereby providing a tweezer-engaging tab at said one end, and a longitudinally entending rib formed on said strip and extending from said one end to a point spaced from said other end to stiffen said strip and facilitate manipulation thereof.

14 The device according to claim 7 in which said paper strip is substantially rectangular when viewed in plan, one end of said strip being angulated with respect to the other end thereof by means of a transverse crease formed across said strip thereby providing a tweezer-engaging tab at said one end, and a longitudinally extending rib formed on said strip and extending from said one end to a point spaced from said other end to stiffen said strip and facilitate manipulation thereof.

15. In a device for the quantiative measurement of fluid on paper strips which includes a casing, a regulated power supply, circuitry connected to said power supply, and a digital readout meter operatively connected in said circuit; a variable capacitor means in said circuit, said variable capacitor means includes a pair of plates and a dielectric strip engageable therebetween, said strip comprising a paper strip capable of receiving fluid thereon, the amount of fluid varying the capacitance of said capacitor, and means operatively connecting said capacitor to the said digital readout meter whereby said meter indicates the volume of fluid on said paper strip.

16. The variable capacitor means according to claim 15 which includes means to adjust the parallel relationship between the interfacial engagement of said jaws, said last means including an insulated block, said fixed jaw being mounted on said block and extending upwardly therefrom, a base plate secured to the underside of said block, and a plurality of adjustable mounting screws screw threadably securing said base plate to the upper panel of said casing whereby adjustment of said screws varies the position within limits, of said fixed jaw relative to the plane of said upper jaw.

17. The device according to claim 11 in which said paper strip is substantially rectangular when viewed in plan, one end of said strip being angulated with respect to the other end thereof by means of a transverse crease formed across said strip thereby providing a tweezer-engaging tab at said one end, and a longitudinally extending rib formed on said strip and extending from said one end to a point spaced from said other end to stiffen said strip and facilitate manipulation thereof.

18. The device according to claim 12 in which said paper strip is substantially rectangular when viewed in plan, one end of said strip being angulated with respect to the other end thereof by means of a transverse crease formed across said strip thereby providing a tweezer-engaging tab at said one end, and a longitudinally extending rib formed on said strip and extending from said one end to a point spaced from said other end to stiffen said strip and facilitate manipulation thereof.

* * * * *